Patented Feb. 18, 1930

1,747,531

UNITED STATES PATENT OFFICE

WERNER SCHULEMANN, OF VOHWINKEL-HAMMERSTEIN, AND FRITZ SCHÖNHÖFER AND AUGUST WINGLER, OF ELBERFELD, GERMANY, ASSIGNORS TO WINTHROP CHEMICAL COMPANY, INC., OF NEW YORK, N. Y.

MANUFACTURE OF NEW PHARMACEUTICAL PRODUCTS

No Drawing. Application filed August 24, 1925, Serial No. 52,230, and in Germany September 11, 1924.

The present invention relates to compounds of the general formula:

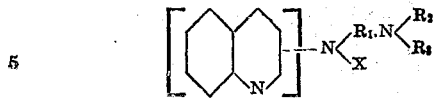

wherein X represents hydrogen, an alkyl group, an amino-alkyl group, or any other monovalent substituent; $R_1$ represents an alkylene residue in which the hydrogen atoms may be substituted by monovalent substituents such as the hydroxyl group; $R_2$ and $R_3$ represent hydrogen, an alkyl group, or an amino-alkyl group; and wherein the quinoline nucleus may be further substituted, and to a process of preparing the same.

We have found that these compounds are exceedingly valuable and effective new remedies for use in therapy.

The manufacture of our new compounds can be effected in several ways. For instance, a compound of the general formula:

wherein X represents hydrogen, an alkyl group, or an amino-alkyl group and wherein the quinoline nucleus may be further substituted may be caused to be acted upon by a compound of the general formula:

wherein Y represents halogen, $R_1$ an alkylene residue in which the hydrogen atoms may be substituted by a monovalent substituent such as the hydroxyl group and $R_2$ and $R_3$ represent hydrogen, an alkyl group or an amino-alkyl group and wherein the quinoline nucleus may be substituted or not.

Instead of the last mentioned compound one may use a salt of this compound with an inorganic acid or a substitution product thereof, such as the bromo-ethyl-phthalimide compound. In the last case the phthalic acid is to be split off subsequently.

The manufacture can be carried out in different steps, for example by first acting on a compound of the general formula:

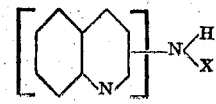

wherein X represents hydrogen, an alkyl group, or an amino-alkyl group and wherein the quinoline nucleus may be further substituted, with ethylene oxide or a halogenated alcohol and converting the hydroxy-alkyl-amino compounds, thus obtained, into the corresponding amino-alkyl-amino compounds in the customary manner. It will be understood that yet another method of execution of the present invention consists in the conversion of intermediate products suitable for the manufacture of the above mentioned amino derivatives of the quinoline series, their derivatives, substitution products and equivalents into more strongly basic amino-derivatives thereof according to any of the methods outlined above, or according to any other customary method, subsequently transforming the intermediate compounds thus obtained into the said more strongly basic amino-derivatives. Both primary and secondary amino-derivatives of the quinoline series, their derivatives, substitution products and equivalents can be converted into said more strongly basic amino-derivatives. Moreover, it is also possible to use amines which contain not only one but several amino groups and likewise the side-chain carrying the aliphatic nitrogen, whether occurring only once or several times, may be either straight or branched and the aliphatic nitrogen atom may happen to be in the $\beta$ or $\gamma$ position or even further removed from the amino-groups.

*Example 1*

Diethylaminoethyl-8-aminoquinoline:

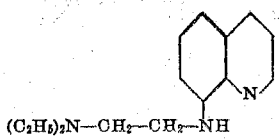

14.4 parts by weight of ortho-aminoquinoline are heated on an oil-bath at 120-140° for 24 hours with 17.2 parts by weight of the hydrochloride of diethyl-aminoethyl chloride. The melt is boiled out with 200 parts of water and filtered. The filtrate is cooled and salted out with potassium carbonate, the resinous mass which is thus precipitated being extracted with ether. The ether solution is thereupon washed several times with water, then dried and the ether distilled off. The contents of the vessel are steam distilled until all traces of o-amino-quinoline are eliminated. Thereupon the residue is again extracted with ether and after distilling off the ether the remaining oil is fractionated and redistilled, boiling at 180-182° C. under 4-5 mm. pressure. The resulting compound is a light oil, which dissolves in dilute hydrochloric acid very readily.

*Example 2*

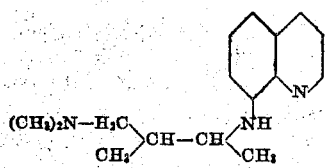

14.4 parts by weight of o-aminoquinoline and 15.05 parts by weight of the hydrochloride of α-dimethylamino-β-methyl-γ-chlorbutane are caused to react as in the above example and the resulting product is similarly worked up.

It is a viscous oil, boiling at 175-183° C. under 2-3 mm. pressure.

*Example 3*

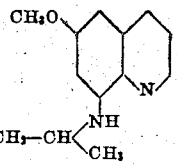

The compound of the formula is prepared by causing 6-methoxy-8-aminoquinoline to react with α-diethylamino-δ-chloropentane. The preparation of the latter chloroalkylamine is effected by the decomposition of diethylamino-ethyl chloride with the sodium compound of aceto-acetic ester, with the subsequent splitting up of diethylaminoethyl-acetoacetic ester into α-diethylamino-δ-pentanone, which after reduction of the keto group to the carbinol group, is converted into the chloride. The exact proportions used and the conditions of the above reaction are described as follows:

135 parts by weight of diethylamino-ethyl chloride are allowed to drop slowly with constant stirring into a mixture of a solution of 23 parts by weight of sodium in 380 parts by weight of alcohol with 130 parts by weight of acetoacetic ester, the whole being kept at 50° C. When the addition is complete the whole is heated under reflux for 4-5 hours, the alcohol is then distilled off and the residual ester worked up in the customary manner. The ester is dried over anhydrous sodium sulfate after which it distils as a colorless liquid, retaining a slightly basic odor and boiling at 115-120° C. under a pressure of 5 mm. For the production of the corresponding ketone referred to above, the ester is heated on the water bath with ten times its weight of 10 per cent sulfuric acid, until the evolution of carbon dioxide is complete. The aminoketone is isolated from the sulfuric acid solution by rendering the same alkaline with potassium carbonate, distilling with steam and salting out the aqueous distillate with potassium carbonate. The aminoketone is dried over potassium carbonate and distilled giving a colorless liquid boiling at 83-85° C. under 15 mm. pressure. Reduction with sodium amalgam at ordinary temperature in acetic acid solution furnished the amino-alcohol, a liquid of boiling point 97° C. under 15 mm. pressure and this is converted into α-diethylamino-δ-chloropentane by heating for 6-8 hours with an excess of thioxyl chloride in benzene solution. The product is isolated from the benzene solution by shaking with water and salting out the aqueous solution with potassium carbonate while cooling the whole with ice. It is easily transformed, especially on warming, into a solid quaternary compound and is converted into the hydrochloride with dry hydrochloric acid gas in ether or benzene solution, without the necessity of effecting distillation. The crude hydrochloride melts at 93° C. For the reaction with 6-methoxy-8-aminoquinoline, 174 parts by weight of the latter are melted with 217 parts by weight of the above hydrochloride and heating is continued at 120-130° C. for some 8 hours with continuous stirring. The reaction product is dissolved in water and worked up as described in Example 1. The quinoline compound thus obtained is a viscous yellow oil which boils under 2 mm. pressure at 189-190° C.

*Example 4*

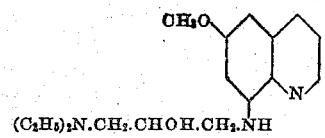

For the manufacture of α-diethylamino-β-hydroxy-γ-chloropropane 92.5 parts by weight of epichlorhydrin in four times the amount of water are vigorously stirred with a neutral aqueous solution of 109.5 parts by weight of diethylamine hydrochloride at ordinary temperature until all the epichlorhydrine has been taken up by the solution. The solution is thereupon rendered alkaline at 0-5° C. with the equivalent amount of potassium carbonate and stirring is maintained for a further 12 hours at the same temperature. The practically completely clear solution is cooled well with ice and salted out with potassium carbonate, the oil which separates being extracted with ether. After thoroughly drying over anhydrous magnesium sulfate the ether together with any remaining diethylamine is evaporated in vacuo. The remaining chloroxyalkylamine, an extremely decomposable liquid, is converted at once into the hydrochloride in ether or benzene solution. The chloride is not stable in the free state, being transformed almost momentarily especially on warming, into a solid quaternary compound.

For the decomposition with 6-methoxy-8-aminoquinoline, 114 parts by weight of the latter and 202 parts by weight of the crude hydrochloride of α-diethylamino-β-hydroxy-γ-chloropropane obtained in the above manner are treated as described in Example 4. The quinoline compound thus obtained is an orange-yellow viscous oil, boiling at 225–227° C. at 2 mm. pressure.

*Example 5*

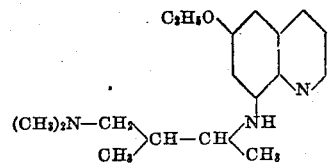

188 parts by weight of 6-ethoxy-8-aminoquinoline are heated with 149 parts by weight of α-dimethylamino-β-methyl-γ-chlorobutane with the addition of a mixture of equivalent amounts of magnesium and barium oxides, to 120–130° C. for some 8 hours with constant stirring. The reaction product is taken up in dilute hydrochloric acid and the hydrochloric acid solution is further treated as described in Example 1. The quinoline compound thus obtained is a yellow viscous oil boiling at 204° at 1 mm. pressure.

*Example 6*

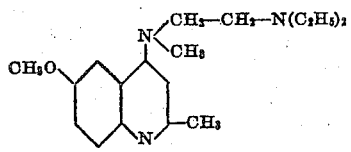

9 parts by weight of 4-chloro-2-methyl-6-methoxy-quinoline are heated under pressure in 40 parts by weight of alcohol with 6 parts by weight of diethylaminoethyl-methylamine for some 9 hours.

The clear alkaline solution thus obtained is evaporated, diluted with water, the base is precipitated with potassium carbonate and dissolved in ether. The ethereal solution is then washed with water and dried. The crude base obtained on evaporating the ether is distilled in vacuo, boiling at 179–180° C. at ½ mm. pressure. The distillate is a viscous yellow oil, easily soluble in acids.

We claim:—

1. As new products the compounds of the general formula:

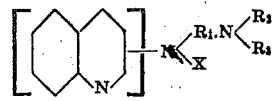

wherein X represents hydrogen, an alkyl group, an amino-alkyl group, or other monovalent substituent; $R_1$ represents an alkylene residue in which the hydrogen atoms may be substituted by monovalent substituents such as the hydroxyl group; $R_2$ and $R_3$ represent hydrogen, an alkyl group, or an amino-alkyl group; and wherein the quinoline nucleus may be further substituted.

2. As new products the compounds of the general formula:

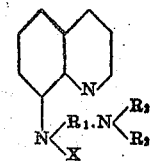

wherein X represents hydrogen, an alkyl group, an amino-alkyl group, or other monovalent substituent; $R_1$ represents an alkylene residue in which the hydrogen atoms may be substituted by monovalent substituents such as the hydroxyl group; $R_2$ and $R_3$ represent hydrogen, an alkyl group, or an amino-alkyl group; and wherein the quinoline nucleus may be further substituted.

3. As new products the compounds of the general formula:

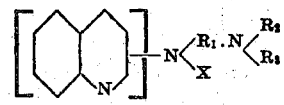

wherein X represents hydrogen or an alkyl group; $R_1$ an alkylene residue containing at least two but no more than five carbon atoms and in which one of the hydrogen atoms may be substituted by a hydroxyl group; $R_2$ and $R_3$ represent hydrogen atoms or methyl- or ethyl groups; and wherein the quinoline nucleus may be further substituted.

4. As new products the compounds of the general formula:

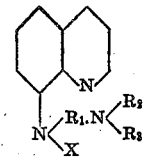

wherein X represents hydrogen or an alkyl group; $R_1$ an alkylene residue containing at least two but no more than five carbon atoms and in which one of the hydrogen atoms may be substituted by a hydroxyl group; $R_2$ and $R_3$ represent hydrogen atoms or methyl- or ethyl groups; and wherein the quinoline nucleus may be further substituted.

5. As new products the compounds of the general formula:

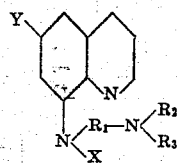

wherein X represents hydrogen or an alkyl group; $R_1$ an alkylene residue containing at least two but no more than five carbon atoms and in which one of the hydrogen atoms may be substituted by a hydroxyl group; $R_2$ and $R_3$ represent hydrogen atoms or methyl- or ethyl groups; and $y$ represents a hydrogen atom, an alkoxy- or a hydroxyl group.

6. As new products the compounds of the general formula:

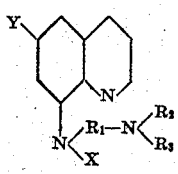

wherein X represents hydrogen or an alkyl group; $R_1$ an alkylene residue containing at least two but no more than five carbon atoms and in which one of the hydrogen atoms may be substituted by a hydroxyl group; $R_2$ and $R_3$ represent hydrogen atoms or methyl- or ethyl groups; and $y$ represents a methoxy- or ethoxy group.

7. As a new product the compound of the formula:

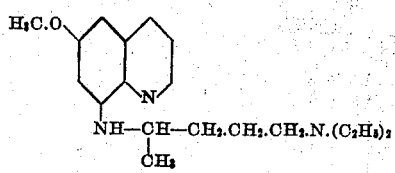

being a viscous yellow oil boiling under a pressure of 2 mm. at a temperature of 189–190° C.

In testimony whereof we have hereunto set our hands.

WERNER SCHULEMANN.
FRITZ SCHÖNHÖFER.
AUGUST WINGLER.